(12) United States Patent
Coveney et al.

(10) Patent No.: US 6,787,507 B1
(45) Date of Patent: Sep. 7, 2004

(54) STABILIZING CLAYEY FORMATIONS

(75) Inventors: Peter V. Coveney, Woodford Green (GB); Michael Watkinson, London (GB); Andrew Whiting, Northwich (GB); Edo S. Boek, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/581,485

(22) PCT Filed: Dec. 10, 1998

(86) PCT No.: PCT/GB99/03700

§ 371 (c)(1),
(2), (4) Date: Jul. 31, 2000

(87) PCT Pub. No.: WO99/31353

PCT Pub. Date: Jun. 24, 1999

(30) Foreign Application Priority Data

Dec. 13, 1997 (GB) .............................. 9726331

(51) Int. Cl.[7] .......................... E21B 43/27; E21B 33/13
(52) U.S. Cl. ...................... 507/266; 507/239; 507/261; 507/268; 166/294; 166/295; 166/300
(58) Field of Search ................................ 166/294, 295, 166/300; 507/129, 136, 139, 239, 261, 266, 268

(56) References Cited

U.S. PATENT DOCUMENTS

| | | | |
|---|---|---|---|
| 3,578,781 A | | 5/1971 | Abrams et al. |
| 3,796,263 A | * | 3/1974 | Hudson et al. ............. 166/295 |
| 3,941,191 A | | 3/1976 | Pusch |
| 4,137,971 A | | 2/1979 | Shaughnessy et al. |
| 4,158,521 A | * | 6/1979 | Anderson et al. ........... 166/295 |
| 4,172,800 A | | 10/1979 | Walker |
| 4,307,980 A | * | 12/1981 | Meyer et al. ................ 166/295 |
| 4,497,596 A | | 2/1985 | Borchardt et al. |
| 4,505,833 A | | 3/1985 | Lipowski et al. |
| 4,536,303 A | | 8/1985 | Borchardt |

(List continued on next page.)

FOREIGN PATENT DOCUMENTS

JP 51 109998 9/1976

OTHER PUBLICATIONS

Giannelis Polymer layered silicate nanocomposites Adv. Mater., vol. 8, No. 1, 1996, pp. 29–35.
Lan et al On the nature of polyimide–clay hybrid composites Chem. Mater., vol. 6, 1994, pp. 573–575.
Lan et al Epoxy self–polymerization in smectite clays J. Phys. Chem. Solids, vol. 57, Nos. 6–8, 1996, pp. 1005–1010.
Lan et al Clay–reinforced epoxy nanocomposites Chem. Mater., vol. 6, 1994, pp. 2216–2219.
Messersmith et al Synthesis and characterization of layered silicate–epoxy nanocomposites Chem. Mater., vol. 6, 1994, pp. 1719–1725.
Wang et al Clay–polymer nanocomposites formed from acidic derivatives of montmorillonite and an epoxy resin Chem. Mater., vol. 6, 1994, pp. 468–474.

*Primary Examiner*—Philip C. Tucker
(74) *Attorney, Agent, or Firm*—Thomas O. Mitchell; Robin Nava; Stephen Schlather

(57) ABSTRACT

A method of stabilizing a clayey geological formation surrounding a hydrocarbon well is described. It comprises the step of treating the formation with a first reactant and a second reactant, characterized in that a reaction of said first and said second reactant is essentially initiated in the presence of clayey material. The reaction can be characterized by substrate intercalation or condensation stabilization with no pH adjustment or stabilization through reaction of glycol with a carbonyl group containing second reactant or a reaction involving an epoxide ring opening under neutral or acidic conditions.

6 Claims, 2 Drawing Sheets

U.S. PATENT DOCUMENTS

| | | | |
|---|---|---|---|
| 4,536,304 A | 8/1985 | Borchardt | |
| 4,536,305 A | 8/1985 | Borchardt et al. | |
| 4,563,292 A | 1/1986 | Borchardt | |
| 4,625,802 A * | 12/1986 | Sydansk | 166/300 |
| 4,693,639 A * | 9/1987 | Hollenbeak et al. | 166/294 |
| 4,703,800 A | 11/1987 | Hanna | |
| 4,715,746 A | 12/1987 | Mann et al. | |
| 4,761,099 A | 8/1988 | Mann et al. | |
| 4,787,453 A * | 11/1988 | Hewgill | 166/294 |
| 4,828,726 A | 5/1989 | Himes et al. | |
| 4,830,765 A | 5/1989 | Perricone et al. | |
| 4,842,073 A | 6/1989 | Himes et al. | |
| 4,889,885 A | 12/1989 | Usuki et al. | |
| 4,965,292 A | 10/1990 | Müller et al. | |
| 5,089,151 A | 2/1992 | Hall et al. | |
| 5,097,904 A | 3/1992 | Himes | |
| 5,099,923 A * | 3/1992 | Aften et al. | 166/294 |
| 5,152,906 A | 10/1992 | Aften et al. | |
| 5,197,544 A | 3/1993 | Himes | |
| 5,201,612 A | 4/1993 | Gadelle et al. | |
| 5,211,250 A * | 5/1993 | Kubena, Jr. et al. | 166/294 |
| 5,242,021 A | 9/1993 | Gadelle et al. | |
| 5,342,530 A | 8/1994 | Aften et al. | |

\* cited by examiner

STABILIZING CLAYEY FORMATIONS

This application is a 371 of PCT/GB98/03700 filed Dec. 10, 1998 which claims benefit of application GB 9726331.3 filed Dec. 13, 1997.

This invention relates to compositions and methods for stabilizing subterranean clayey formations surrounding a borehole. More specifically, it pertains to clay stabilizing additives for aqueous fluids used in drilling, completing and maintaining boreholes.

BACKGROUND OF THE INVENTION

When geological formations containing water swelling clays come in contact with water, particularly fresh water, clays in the formations may swell and/or disperse with attendant loss of permeability and/or mechanical strength to interfere with recovery of petroleum or other minerals from the formations. Swelling and dispersion occur when aqueous fluids used in oil recovery come in contact with the clays. Clayey formations are often impermeable or have low permeability or lose part or all of their permeability on contact of the clays with water or water base systems such as injection fluids, drilling muds, stimulation fluids and gels. Dispersed clays may also invade a permeable producing formation during drilling to create low permeability zone in the vicinity of the borehole.

Given the importance and the ubiquity of clayey or shaley formations, it is not surprising that much effort has been put into developing and improving additives for clay or shale inhibition. Various methods and additives can be found for example in the U.S. Pat. Nos. 5,342,530, 5,211,250, 5,197,544, 5,152,906, 5,099,923, 5,097,904, 5,089,151, 4,842,073, 4,830,765, 4,828,726, 4,563,292, 4,536,303, 4,536,304, 4,536,305, 4,505,833, 4,497,596, 4,172,800 and 3,578,781.

These additives usually are salts and/or polymers which effectively prevent the water from permeating the clay.

Furthermore, it is known to consolidate sandstone and other highly porous and weak formations with a fluid containing polymerizable materials, such as resins or isocyanates in combination with diols. Those methods are described for example in the U.S. Pat. Nos. 5,242,021, 5,201,612, 4,965,292, 4,761,099, 4,715,746, 4,703,800, 4,137,971, or 3,941,191. It is however important to note that the permeability of sandstones and similar formations differ from those of shale formations by several orders of magnitude. The consolidation of highly porous, unstable sandy formations and shale formations with a very low porosity are therefore generally recognized in the art as separate technical fields.

In technical fields unrelated to the present invention, efforts to form composites of clayey materials have been described. The known methods of forming so-called "nanocomposites" include the is addition of a reactive (monomeric or polymeric) species to clays which have been previously treated with another compound with which it will react. The ensuing chemical reaction can occur in one of two ways: either the second additive is capable of physically cross-linking the polymer, or it promotes further self-polymerization. Such processes can result in nanocomposite silicate-polymers which attain a certain degree of stiffness, strength and barrier properties with far less ceramic content than comparable glass- or mineral-reinforced polymers. As such they are far lighter in weight than conventionally filled polymers. Examples are provided by the following references: 'Polyamide-Organoclay Composites', S. Fujiwara and T. Sakamota, Japan, Patent 51 109,998, 1976; 'Composite Material Containing a Layered Silicate', A. Usaki et al, Toyota, U.S., U.S. Pat. No. 4,889,885, (1989); M. S. Wang and T. J. Pinnavaia, 'Clay-Polymer Nanocomposites Formed from Acidic Derivatives of Montmorillonite and an Epoxy Resin', *Chem. Mater.*, 6, 468, (1994); T. J. Pinnavaia et al, 'On the Nature of Polyimide-Clay Hybrid Composites', *Chem. Mater.*, 6, 573, (1994); P. B. Messersmith and E. P. Giannelis, 'Synthesis and Characterization of Layered Silicate-Epoxy Nanocomposites,' *Chem. Mater.*, 6, 1719, (1994); T. Lan and T. J. Pinnavaia, 'Clay-Reinforced Epoxy Nanocomposites, *Chem. Mater.*, 6, 2216, (1994); E. P. Giannelis, 'Polymer Layered Silicate Nanocomposites', *Adv. Mater.*, 8, 29, (1996); T. J. Pinnavaia et al, 'Epoxy Self-Polymerization in Smectite Clays', *J. Phys. Chem. Solids*, 57, 1005, 1996. In spite of the stabilization and strengthening that these additives impart to the resultant nanocomposite materials, there are currently several limitations to this technology which are important from an oilfield perspective. One is that the established methodology necessarily involves a high-temperature curing process for the chemical reactions to take place; another is that such an approach inevitably results in the production of composites in which the silicate is delaminated and randomly distributed within the polymer matrix. No technology has been developed which is capable of stabilizing clay silicates under ambient, aqueous conditions.

In view of the above, it is an object of the invention to provide a novel method of stabilizing subterranean clayey formations surrounding a borehole. It is another, more specific object of the invention to provide clay stabilizing additives for aqueous fluids used in drilling, completing and servicing boreholes under conditions appropriate to drilling oil wells.

SUMMARY OF THE INVENTION

This invention is concerned with the identification of a wide range of compounds which are capable of strengthening and stabilizing clay and shale minerals through a process of in-situ polymerization. These diverse compounds (or "additives") include both monomers and polymers, in aqueous solution or suspension. The resulting nanocomposite materials, which have dramatically enhanced mechanical properties compared with the original clay and shale samples, have a vast range of potential materials-science and materials-technology applications both within and outside the oilfield.

In chemical terms, the invention comprises a wide variety of additives which are capable of stabilizing clay films in aqueous solution. The additives that have been tested encompass four broad areas: (1) species which are capable of intercalating clay galleries and affording stabilization such as diamines, polyethylene glycols (PEGs), polypropylene glycols (PPGs) and polymeric diamines; (2) reagents which are capable of undergoing condensation reactions and thus polymerizing in-situ such as diamines, aldehydes, ketones, dicarboxylic acids; (3) reagents which are capable of ring opening of epoxides or acrylates effecting polymerization in-situ such as alcohols, amines; (4) reagents which are capable of self-polymerization within clay galleries such as alkenes. All of these techniques provide considerable stabilization over untreated films.

There are three main applications of the invention. Firstly, it is envisaged that a drilling mud formulation containing a combination of the specified compounds described below may be used as a clay and shale swelling inhibitor fluid, to maintain the integrity of the wellbore during conventional drilling operations. Secondly, a completion fluid formulation containing a combination of the same compounds may be used for general remedial operations in the wellbore. Finally, the invention may be used to achieve with the goal of "casingless drilling", that is to achieve with one and the same drilling and completion fluid the equivalent result of what is today obtained through a combination of drilling, casing and cementing operations.

These and other features of the invention, preferred embodiments and variants thereof, and further advantages of the invention will become appreciated and understood by those skilled in the art from the detailed description following below.

EXAMPLE(S) FOR CARRYING OUT THE INVENTION

Figure 1:
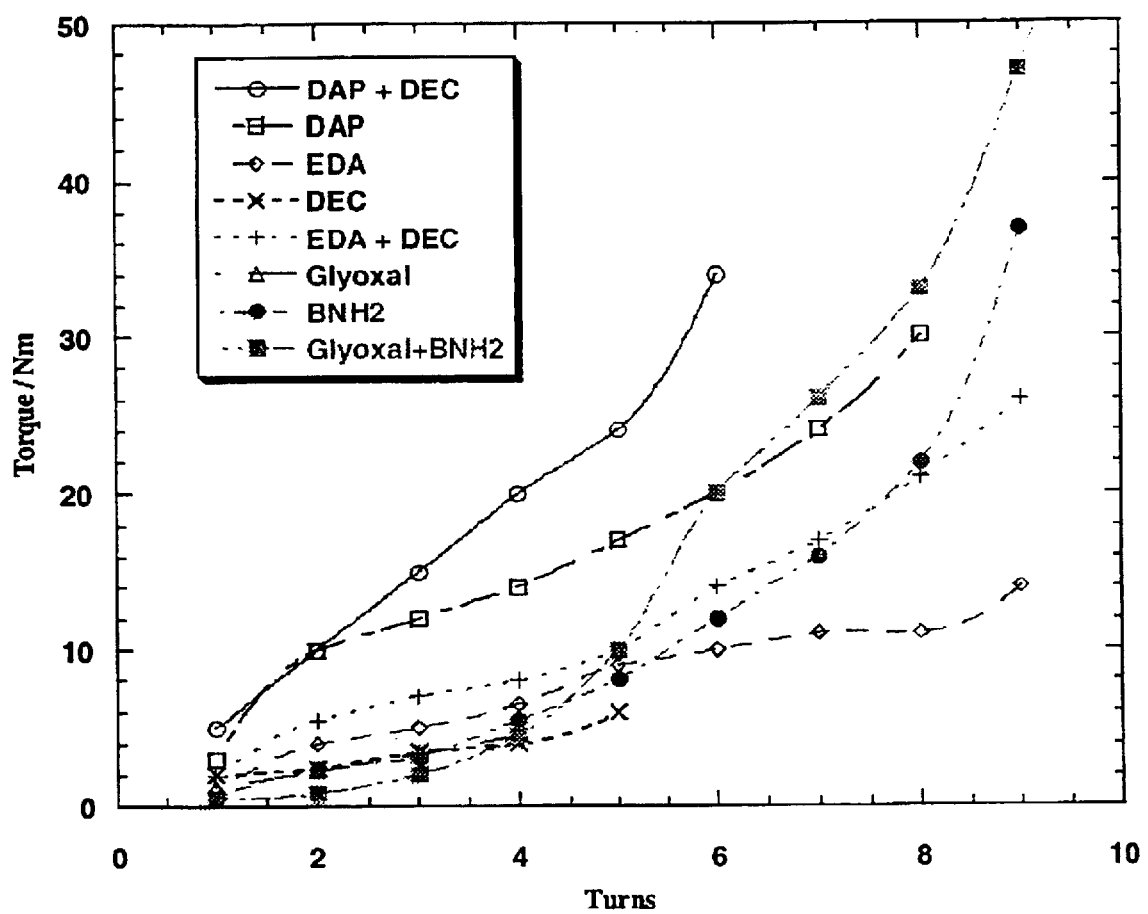
FIG. 1. shows the cuttings hardness data for the combinations of DAP, DEC, EDA, BNH2 and Glyoxal, together with the corresponding results for each of the components on its own in water.

The level of clay stabilization provided by different additives and formulations were assessed by several laboratory techniques.

All combinations of chemical compounds were initially assessed using thin clay films as the substrate. In this testing procedure a small piece of montmorillonite clay film is treated with a combination of reagents which might be capable of cross-linking or polymerizing inside clay layers and examining the resulting clay for strength and rigidity in a qualitative manner. The treated films were extracted with chloroform and the extract analysed by Mass Spectrometry for direct evidence of polymerisation. The most definitive evidence for polymerisation was obtained by solid state NMR on films produced from Laponite, a synthetic clay without the paramagnetic impurities present in the natural montmorillonite clay.

Some of the combinations were then assessed in an outcrop shale, Oxford Clay, by measuring the permeability change induced in a shale core and/or the change in hardness of shale cuttings when exposed to the reactive chemistry.

(1) Clay Film Tests

In this testing procedure a small piece of montmorillonite clay film is treated with a combination of reagents which might be capable of cross-linking or polymerizing inside clay layers and examining the resulting clay for strength and rigidity in a qualitative manner.

All the film tests described below were performed on the same batch of montmorillonite clay films. The films have been stored in a refrigerator in sealed Petri dishes and checked periodically by infrared spectroscopy to ensure integrity of the samples.

A very wide range of potential stabilizers were examined in terms of their chemical reactivity, structure and the conditions under which the tests were performed. All tests have been performed in an identical manner by the addition of a piece of montmorillonite film to an aqueous solution of the intercalator (5 cm$^3$ of a 5% w/w solution), the pH of which had already been adjusted (where necessary, with 10% v/v aqueous HCl solution). The potential cross-linking reagent was then immediately added. The intercalating reagents investigated were BNH$_2$, B2P, B4P, DAP, DEA, EA, EDA, EG, HQ, P, PA, PC, PEDG, PPD, PPDG and STAPLEX650 and the potential cross-linkers A, AA, BA, DEC, DEM, DEO, DIT, DMM, EPP, FS, GA, MA, OA, PPDGE, PO and styrene. Cross-linkers were added as either neat reagents (0.5 cm$^3$ A, DEM, DEO, DIT, DMM, EPP, MA, PPDGE, PO, styrene and 0.5g BA) or as aqueous solutions (5 cm$^3$ 5% w/w solution AA, DEC, OA; 1 cm$^3$ of 50% w/w solution GA and 5 cm$^3$ of a 37% w/v solution FS). Films were then allowed to stand in the reaction mixture for 1 day before washing with distilled water and were then placed in fresh distilled water to monitor their long term stability. (The abbreviations used in this paragraph and the following are listed in Table 0.)

The montmorillonite film tests provided a means of ascertaining the potential of a number of reagent combinations; the results are summarized in Table 1 (In Table 1, the term "Stable" applied to describe the film stability means that such films do not dissolve in water, while "Exfoliates" simply means they are visibly fatter after treatment. The latter term does not mean the films fall apart; this only happens if extreme exfoliation occurs and the resulting material does not have a matrix around it which "sets".) These combinations can be broadly divided into four categories, i.e., (a) Substrate intercalation; (b) Condensation stabilization with no pH adjustment; (c) Stabilization through epoxide ring opening under neutral or acidic conditions; (d) Substrate in-situ polymerization.

Physical intercalation of the investigated compounds into the interlamellar layers of the clay, the clay galleries, is a condition for the subsequent chemical reactions, as mentioned below under (b), (c) and (d), to occur. Intercalation itself without chemical reaction, described under (a), is in some cases capable of enhancing the stability of the clay. However, it is the subsequent reaction that gives an increased clay stability.

(a) Substrate Intercalation

Three films (3, 6 and 24, Table 1) were treated with potential intercalators without any chemical cross-linking reagent capable of forming covalent bonds. It was found that by mixing PEG and BNH$_2$ solutions in equal quantities a very stable film could be produced. This is consistent with the effect of BNH$_2$ alone, but shows considerable improvement on PEG stabilization, indicating that amines are considerably superior for the stabilization of clays.

(b) Condensation Stabilization

These films are generally the most robust films that have been produced. Particularly impressive properties being associated with films 1, 7, 34, 37, 40, 42 and 43 (Table 1). These types of additives are preferred for bore-hole stabilization. In addition to these treatments, a number of other treatments are available (films 50, 51, 52 and 53 are particularly stable) and that some very interesting effects can occur within apparently similar reactant sets; e.g. although EA provides a stable film with DEC (film 53), the related DEA does not, and the film decomposes upon soaking in fresh water (film 54). Attempts to produce polyesters appears to have been less successful (films 55–62). However, it is interesting to note that both film 57 and 61 were both very much more robust than any of the other films in this series.

The condensation reactions required to provide stabilization in clay galleries involve equilibria between reactants and condensation products. Under aqueous conditions the reactants will clearly be favored, a situation akin to that pertaining in drilling fluids. However, upon intercalation in the interlamellar layer an anhydrous environment is created, through the concomitant expulsion of water. These conditions facilitate the condensation process and lead to film stabilization whilst preventing substrate polymerization in the drilling mud.

(c) Ring Opening Stabilization

The chemical process achieved by the ring opening of epoxides is akin to the synthesis of a number of polymers, including e.g. PEG, in which a chain reaction is started after initial ring opening resulting in an in situ epoxide polymerization. To produce a stable film, acidic solutions is employed; the acidity of which is dependent upon both the intercalator and the cross-linker. When the diamines (EDA, DAP and $BNH_2$) are used, only mildly acidic (ca. pH 6) conditions are required with both PO and EPP to produce very robust films (10, 11, 14, 15 and 25–27, Table 1). With PPDGE, much more acidic conditions (pH 2) produce more impressive films (28, 29) than at less acidic pH (films 9, 29). Stable films can be produced by adding a small quantity of a diamine solution to the bulk PEG liquor and treating them with epoxides under mildly acidic conditions (16B and 17). Films can also be stabilized with PEG and all of the epoxides, although more acid conditions (pH 2) are required (30–32); the resultant films are very soft but stable.

(d) Substrate In-situ Polymerization

Of the four methods investigated to produce stable films, this has been the least successful. This is perhaps not entirely surprising since the polymerisation of a substrate necessitates a reaction initiator and it is difficult to control this process. This problem is highlighted by film 12 which resulted in the entire test solution polymerising. Generally, this reaction type produces exfoliated films (2, 4, 5, 8 and 20), which are often considerably swollen and blistered, indicating that the reactions are rapid and too aggressive for the films. Whether these reactions are of use to stabilise shale is currently an open question. Clearly, a solution which polymerises, as is the case for 12, is undesirable, but the stable film produced with EDA and A (film 33) indicates that there is some potential in this methodology.

Evidence for Absorption into the Interlamellar Layer of Substrates

It is important to establish that the reagents are actually binding within the interlamellar layers of the films rather than merely polymerizing on the film surface. Evidence for an intercalation effect was established through the use of X-ray diffraction studies on a number of stable films; see Table 1. It can be clearly seen that changing the intercalating substrate changes the d-spacings of the montmorillonite films. What perhaps provides more conclusive evidence of a genuine polymerization within the interlamellar layer are the range of d-spacings that are observed for the intercalating substrate, EDA. Values ranging from 12.72 Å (film 36) to 17.72 Å (film 34) are observed. Both of these films are stable, flexible and hard and show no signs of exfoliation typical of swelling due to water viz. marked whitening.

Perhaps even more revealing are the different spacings observed for the same substrates in films 36–38. Although the treated films all have relatively similar properties (with perhaps most superior behavior attributable to film 37) the d-spacings are different. The two films (36 and 38) which have been adjusted to acidic pH both show similar d-spacings of ca. 13 Å whereas film 37 (in which unchanged substrates have been employed) shows a d-spacing of ca. 15 Å.

Stability of Treated Films

All films that could be, were washed thoroughly with water and then placed in distilled water to investigate their long term stability under saturated aqueous conditions. All of the treated films (1, 7, 10, 14, 16B, 17, 25, 27–43, 50, 52, 57, 61, 63–66) show very impressive stability with only films 31, 32 and 61 showing any signs of decomposition after up to four months. Films 31 and 32 do show some exfoliation but can still be handled quite readily. Film 61, however, is too fragile to handle and decomposes. One interesting effect is observed after prolonged soaking of films treated with EPP. All, with the exception of film 25, become covered with a sticky coating and some (10, 14, 17) become transparent. The sticky coating can be accounted for due to epoxide leaching from the clay and polymerising on its surface. The second effect is more difficult to account for but must relate to a change in the refractive index of the film in some way upon coating with the polymerising epoxide. This effect also substantiates the absorption of substrates into the clay films (hence confirming X-ray diffraction results and extraction studies for 10) as all substrates external to the clay are initially removed on rinsing. It is worth noting that although the physical properties of these films have changed over a period of time their d-spacings are virtually unchanged. The d-spacings of films 1, 7, 10, 14, 16B and 17 after four months soaking in water are 14.0 Å, 14.0 Å 15.0 Å, 17.2 Å, 17.2 Å and 17.9 Å respectively. The biggest difference between previous measurements and the post-soaking results lie in film 10, which shows a change of nearly 0.6 Å.

Direct Evidence of Polymerization

After extraction of the treated clays (treatments 1, 7, 10, 11, 14, 15, 20, 25, 28,36, 40 and 42) with chloroform, fast atom bombardment (FAB) mass spectrometry indicates that polymerization of the additives has occurred. However, it is also likely that most of the extracted material is derived from surface polymerization since the d-spacings between the clay galleries do not alter upon extraction. It is nevertheless indicative that polymerization must be occurring within the clay galleries.

The most definitive evidence for polymerization has been obtained by solid-state nmr studies using laponite, subjected to treatments 1 and 7 (Table 1). Magic-angle $^{13}C$ NMR clearly shows that all formaldehyde has been polymerised in both samples. For the sample from treatment 1 (BNH2 and FS), three major signals are found at δ15, 47 and a large broad peak centred at δ 70 (covering 25 ppm). The highest field signal is due to the methyl C's, while the remaining signals are due to aminal, methylene and methine carbons. This convincing evidence for polymerisation within the clay was repeated with the sample obtained from treatment 7 (EDA and FS), with peaks at δ34, 45, 54, 67 and 167. The most interesting peak (at 176 ppm) is indicative of either imine or imminium ion formation. The remaining peaks are consistent with EDA methylene C's, aminal C's, poly-acetal C's (from poly-formaldehyde), and mixed hemi-aminal systems.

In the following the results of two further tests are described examining quantitatively the effect of the disclosed method on the clay material:

Cuttings Hardness Tests

Oxford Clay cuttings of between 2 and 4 mm diameter were soaked in the test fluids under static, ambient temperature conditions for 48 hrs. At the end of this period the cuttings were removed from the solution by sieving and placed in the test device. This consisted of a steel plate with an array of holes drilled in it. The cuttings were forced through the holes by a piston attached to a screw thread. Data were recorded as torque on the screw thread against number of turns as the cuttings were extruded. A higher torque value indicates greater clay inhibition.

FIG. 1. shows the cuttings hardness data for the combinations of DAP, DEC, EDA, BNH2 and Glyoxal, together with the corresponding results for each of the components on its own in water. With the exception of EDA+DEC, the performance of the combinations was significantly superior to that of the individual components.

Permeability of Shale

An Oxford Clay core was used to assess the effect of one of the reactive chemistries on permeability. The cylindrical core approximately 25 mm in diameter and 30 mm long was confined in a Hassler cell at a pressure of 8.5 MPa. One end of the core was exposed to fluid at 8.0 MPa and fluid samples were collected from the other end at atmospheric pressure to determine flowrate and therefore permeability.

Figure 2:
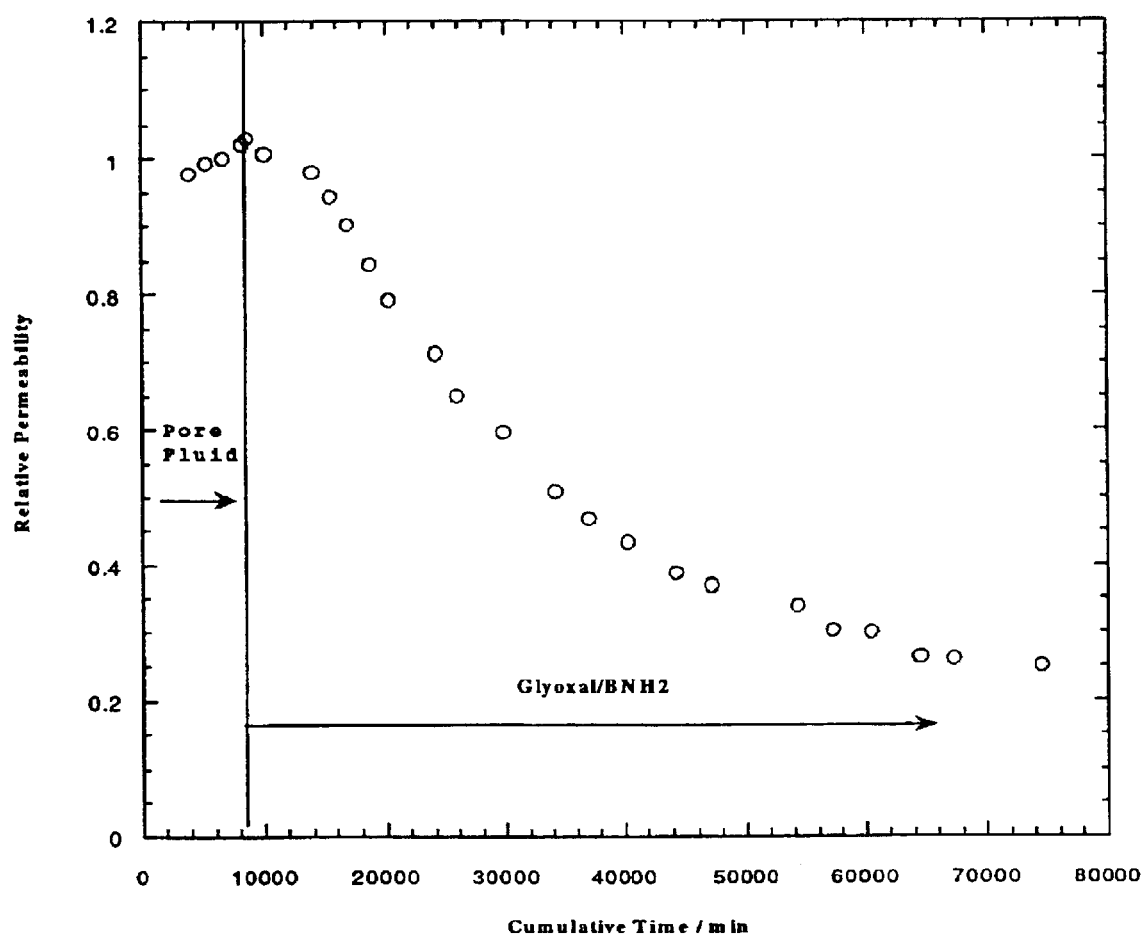
FIG. 2 shows the resulting change in permeability as a reaction in accordance with an example of the present invention progresses through a core sample.

To establish an initial permeability for the untreated core it was first exposed to a synthetic pore fluid. Once a stable flow rate was established this fluid was switched over to the reactive chemistry, BNH2 and Glyoxal, at 5 wt % each in 0.1M $CaCl_2$ and adjusted to pH 9. FIG. 2 shows the resulting change in permeability as the reaction progresses through the core.

TABLE 0

List of abbreviations.

| | |
|---|---|
| .A | Acrolein |
| AA | Adipic acid |
| BA | Boric acid |
| $BNH_2$ | $CH_3CH(NH_2)CH_2—[OCH(CH_3)CH_2]_1—[OCH_2CH_2]_m—[OCH_2CH(CH_3)]_n—NH_2$ |
| B2P | 2-$^t$Butylphenol |
| B4P | 4-$^t$Butylphenol |
| DAP | 1,5-Diaminopentane |
| DEA | Diethanolamine |
| DEC | Diethylcarbonate |
| DEM | Dimethylmalonate |
| DEO | Diethyloxalate |
| DIT | Diisopropyl-D-tartrate |
| DMM | Dimethylmaleate |
| EA | Ethanolamine |
| EDA | Ethylene-1,2-diamine or 1,2-diaminoethane |
| EG | Ethylene glycol |
| EPP | 1,2-Epoxy-3-phenoxypropane |
| FS | 37% w/v Formaldehyde solution |
| GA | 50% w/v Glutaric aldehyde solution |
| HQ | Hydroquinone |
| MA | Methyl acrylate |
| OA | Oxalic acid |
| P | Phenol |
| PA | 2-Acetylpyridine |
| PC | 2-Pyridinecarboxaldehyde |
| PO | Propylene oxide |
| PEDG | Polyethylenediglucamide |

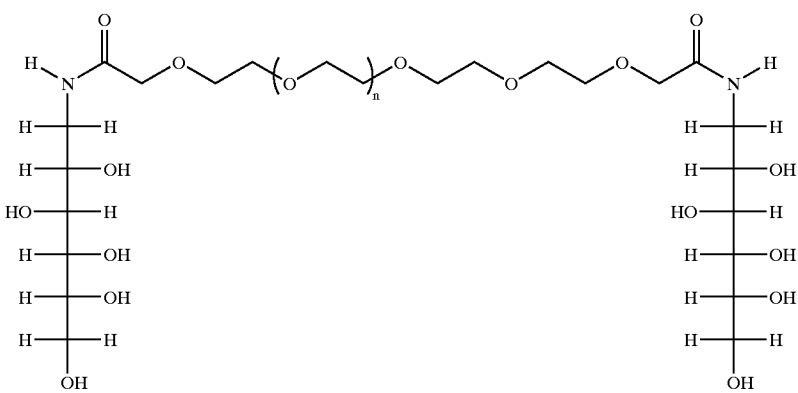

| | |
|---|---|
| PPD | 1,2 Propanediol |
| PPDG | Polypropylenediglucamide |

TABLE 0-continued

List of abbreviations.

PPDGE

PEG

TABLE 1

(Properties of clay nanocomposite materials synthesized)

| Film | Intercalator | Cross-linker | pH | d-spacing (Å) | Film Stability Exfoliates | Film Stability Stable | Film Condition Brittle | Film Condition Flexible | Film Condition Hard or Soft |
|---|---|---|---|---|---|---|---|---|---|
| 1 | BNH$_2$ | FS | na | 14.0 | | Yes | | Yes | Hard |
| 2 | BNH$_2$ | MA/H$_2$O$_2$ | na | — | Yes | | Yes | | Hard |
| 3 | BNH$_2$/PEG | — | na | — | | Yes | Yes | | Hard |
| 4 | PEG | MA | na | — | Yes | | | | Soft |
| 5 | PEG | MA/H$_2$O$_2$ | na | — | Yes | | | | Soft |
| 6 | PEG | BA | na | — | Yes | | | | |
| 7 | EDA | FS | na | 14.4 | | Yes | | Very | Hard |
| 8 | FS | Catalytic H$_2$O$_2$ | na | — | Yes | Yes | Yes | | Hard |
| 9 | EDA | PPDGE | 6 | — | | Yes | Yes | Some | |
| 10 | EDA | EPP | 6 | 15.6 | | Yes | | Yes | Hard |
| 11 | EDA | PO | 6 | — | | Yes | | Yes | |
| 12* | EDA | A | na | — | | | | | |
| 13 | BNH$_2$ | PPDGE | 6 | — | Yes | Yes | Yes | | Hard |
| 14 | BNH$_2$ | EPP | 6.4 | — | | Yes | | Yes | Hard |
| 15 | BNH$_2$ | PO | 6.6 | — | | Yes | Yes | Some | Hard |
| 16B | 4PEG:1BNH$_2$ | EPP | 4 | 17.3 | | Yes | | Yes | Hard |
| 17 | 4PEG:1EDA | EPP | 5 | 17.7 | | Yes | Slightly | Yes | Hard |
| 18 | PEG | EPP | na | — | Yes | | | | Soft |
| 19 | PEG | PO | na | — | Yes | | | | Soft |
| 20 | — | Styrene/H$_2$O$_2$ | na | — | Yes | | | | Soft |
| 21 | PEG | EPP/H$_2$O$_2$ | na | — | Yes | | | | Soft |
| 22 | PEG | PO/H$_2$O$_2$ | na | — | | | | | Soft |
| 23 | DAP | FS | na | — | | Yes | Yes | | Hard |
| 24 | DAP | — | na | — | | Yes | | Yes | Hard |
| 25 | DAP | EPP | 6.5 | 18.6 | | Yes | Slightly | | Hard |
| 26 | DAP | PO | 6.5 | — | | Yes | Yes | | |
| 27 | DAP | PO/EPP | na | 17.2 | | Yes | Yes | | Hard |
| 28 | EDA | PPDGE | 2 | 14.1 | | Yes | | Yes | Hard |
| 29 | BNH$_2$ | PPDGE | 2 | 16.9 | | Yes | Yes | | Hard |
| 30 | PEG | PPDGE | 2 | 17.5 | | Yes | | Yes | Soft |
| 31 | PEG | PO | 2 | 16.5 | Yes | Yes | | | Soft |
| 32 | PEG | EPP | 2 | 16.8 | Yes | Yes | | | Soft |
| 33 | EDA | A | na | 15.1 | | Yes | | Yes | Hard |

TABLE 1-continued (Properties of clay nanocomposite materials synthesized)

| Film | Intercalator | Cross-linker | pH | d-spacing (Å) | Film Stability Exfoliates | Film Stability Stable | Film Condition Brittle | Film Condition Flexible | Film Condition Hard or Soft |
|---|---|---|---|---|---|---|---|---|---|
| 34 | EDA | PC | na | 17.7 | | Yes | | Yes | Hard |
| 35 | EDA | PA | na | 15.1 | | Yes | | | Hard |
| 36* | EDA | AA | 6 | 12.7 | | Yes | | Yes | Hard |
| 37 | EDA | AA | na | 15.0 | | Yes | | Very | Hard |
| 38* | EDA | AA | 2 | 13.0 | | Yes | | Yes | Hard |
| 39* | EDA | OA | 6 | 15.5 | | Yes | Yes | Slightly | Hard |
| 40 | EDA | OA | na | 15.1 | | Yes | | Very | Hard |
| 41* | EDA | OA | 2 | 15.6 | | Yes | | Yes | Hard |
| 42 | EDA | GA | na | 15.5 | | Yes | | Yes | Hard |
| 43 | BNH$_2$ | GA | na | —∞ | Yes | Yes | | Yes | |
| 44 | PEDG | PO | 6 | — | | Yes | | | |
| 45 | PEDG | EPP | 6 | — | | Yes | | | |
| 46 | PEDG | PDGB | 6 | — | | Yes | | | |
| 47 | PPDG | PO | 6 | — | | Yes | | | |
| 48 | PPDG | EPP | 6 | — | | Yes | | | |
| 49 | PPDG | PDGE | 6 | — | | Yes | | | |
| 50 | EDA | DEC | na | — | | Yes | | Very | Hard |
| 51 | BNH$_2$ | DEC | na | — | | Yes | Yes | | Hard |
| 52 | DAP | DEC | na | — | | Yes | | Very | Hard |
| 53 | EA | DEC | na | — | | Yes | | Yes | Hard |
| 54 | DEA | DEC | na | — | | ⊥ | | | Soft |
| 55 | EG | DEM | na | — | Yes | ⊥ | | | Soft |
| 56 | EG | DMM | na | — | Yes | ⊥ | | | Soft |
| 57 | EG | DIT | na | — | Yes | Yes | | Yes | |
| 58 | EG | DEO | na | — | Yes | Yes⊥ | | Yes | |
| 59 | PPD | DEM | na | — | Yes | | | | Soft |
| 60 | PPD | DMM | na | — | Yes | ⊥ | | | Soft |
| 61 | PPD | DIT | na | — | | Yes | | Yes | |
| 62 | PPD | DEO | na | — | Yes | ⊥ | | | Soft |
| 63 | HQ | FS | na | — | | Yes | | Yes | Hard |
| 64 | P | FS | na | — | Some | Yes | | Yes | Hard |
| 65 | B4P | FS | na | — | | Yes | | Yes | Hard |
| 66 | B2P | FS | na | — | Yes | Yes | Slightly | Yes | Hard |

+film 12 test resulted in polymerisation of the intercalator solution on addition of the acrolein
*considerable precipitation of intercalator/cross-linker complex
∞although film 43 is stable no d-spacing was measured due to the non-homogeneous nature of the treated film
⊥All these films decompose upon overnight soaking in fresh water

What is claimed is:

1. A method of stabilizing a clayey geological formation surrounding a hydrocarbon oil well comprising the steps of:
   injecting from a surface reservoir an aqueous fluid comprising a first and a second reactant, wherein the first reactant is a glycol and the second reactant comprises at least one carbonyl group;
   letting said fluid contact said clayey formation;
   allowing intercalation of said first and second reactant into clay galleries of said clayey geological formation; and
   stabilizing said formation by using a reaction between said first and said second reactant, wherein said reaction comprises an in situ polymerization taking place in the presence of clay, within said clay galleries, to maintain the integrity of said hydrocarbon oil well.

2. The method of claim 1, wherein the reaction comprises a condensation stabilization with or without pH adjustment.

3. A method of drilling a wellbore into a potentially hydrocarbon bearing formation comprising the steps of drilling part of said wellbore through a clayey formation and using a method in accordance with claim 1 to stabilize said formation.

4. The method of claim 1, wherein the reaction comprises a stabilization through epoxide ring opening under neutral or acidic conditions.

5. The method of claim 1, wherein a reaction product of said reaction is intercalated in the clay galleries.

6. A method of stabilizing a clayey geological formation surrounding a hydrocarbon oil well comprising the steps of:
   injecting from a surface reservoir an aqueous fluid comprising a first and a second reactant, wherein the first reactant is a diamine or a polyhydric alcohol, wherein the reaction comprises a stabilization through epoxide ring opening under neutral or acidic conditions;
   letting said fluid contact said clayey formation;
   allowing intercalation of said first and second reactant into clay galleries of said clayey geological formation; and
   stabilizing said formation by using a reaction between said first and said second reactant, wherein said reaction comprises an in situ polymerization taking place in the presence of clay, within said clay galleries, to maintain the integrity of said hydrocarbon oil well.

* * * * *